United States Patent [19]

Gurney et al.

[11] 4,297,840
[45] Nov. 3, 1981

[54] CHAIN LINK AND CHAIN ASSEMBLY INCLUDING SAME

[75] Inventors: Gerald W. Gurney, Ada, Mich.; William E. Lanham, Jr., Stone Mountain, Ga.

[73] Assignee: C. L. Frost & Son, Inc., Grand Rapids, Mich.

[21] Appl. No.: 80,656

[22] Filed: Oct. 1, 1979

[51] Int. Cl.³ .............................................. F16G 13/18
[52] U.S. Cl. ..................................... 59/85; 104/172 C
[58] Field of Search ............... 198/687, 685, 683, 733, 198/731; 104/172 C; 59/85–89, 91

[56] References Cited

U.S. PATENT DOCUMENTS

| | | | |
|---|---|---|---|
| 1,189,036 | 6/1916 | Austin | 198/681 |
| 1,910,804 | 5/1933 | Lomando | 198/731 |
| 2,024,183 | 12/1935 | Pribil | 59/8 |
| 2,328,778 | 9/1943 | Bollinger et al. | 59/88 X |
| 2,515,079 | 7/1950 | Dalrymple | 198/189 |
| 2,579,410 | 12/1951 | Zanitis | 198/189 |
| 2,620,676 | 12/1952 | Raddings | 74/243 |
| 2,704,943 | 3/1955 | Harris | 74/246 |
| 2,793,536 | 5/1957 | Onulak | 74/250 |
| 3,093,235 | 6/1963 | Imse | 198/129 |
| 3,128,593 | 4/1964 | King | 59/35 |
| 3,144,748 | 8/1964 | Knop | 59/88 |
| 3,170,335 | 2/1965 | Kuntzmann | 74/250 |
| 3,192,785 | 7/1965 | Pearson | 74/255 |
| 3,194,612 | 7/1965 | Striepe | 308/6 |
| 3,421,313 | 1/1969 | Harada et al. | 59/78 |
| 3,590,744 | 7/1971 | Galloway et al. | 104/172 |
| 3,774,545 | 11/1973 | Karlstrom | 104/172 C |
| 3,844,221 | 10/1974 | Fromme | 59/85 X |
| 3,869,989 | 3/1975 | Pickstone | 104/94 |
| 3,905,304 | 9/1975 | Ord | 104/172 C |
| 3,913,494 | 10/1975 | Coleson et al. | 104/172 S |
| 3,916,797 | 11/1975 | Block et al. | 104/172 B |
| 4,063,413 | 12/1977 | Benton et al. | 59/35 CP |

FOREIGN PATENT DOCUMENTS 1474401 4/1966 France .

OTHER PUBLICATIONS

"12" Chain Assembly", Frost & Son, 3-11-78.

Primary Examiner—Mark Rosenbaum
Attorney, Agent, or Firm—Price, Heneveld, Huizenga & Cooper

[57] ABSTRACT

The specification discloses a chain link assembly and chain incorporating said assembly, the chain being especially adapted for use in enclosed track-type conveyors. The assembly includes a pair of identical, elongated link members fitted together and mating with one another. Each link member has chain pin or fastener receiving openings at either end and a bridge member adapted to engage, support, and space the opposite link member. One end of each link member at the same end of the assembly includes a curved surface with elongated chain pin receiving openings to allow articulation of the assembly at that one end. The opposite ends are planar.

15 Claims, 8 Drawing Figures

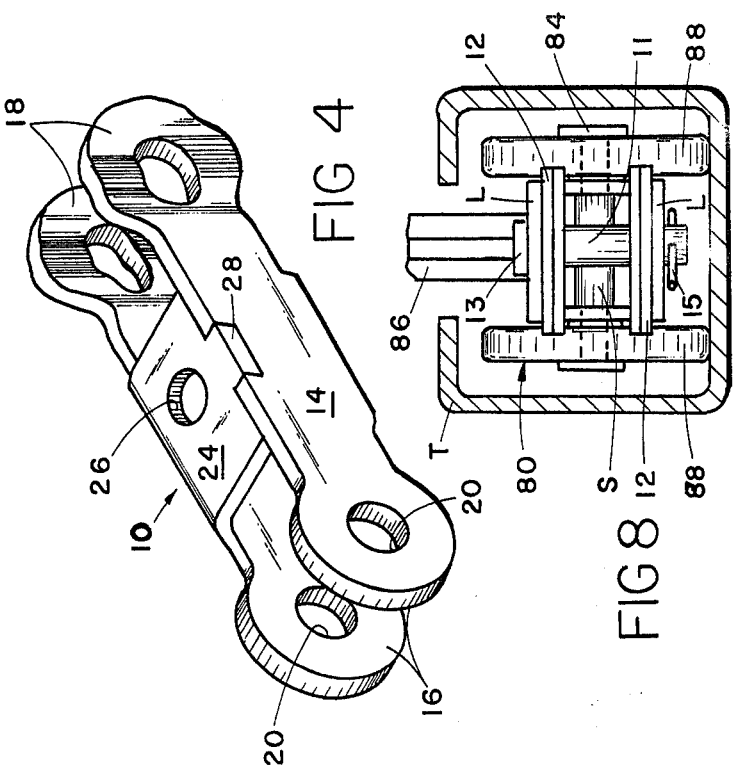

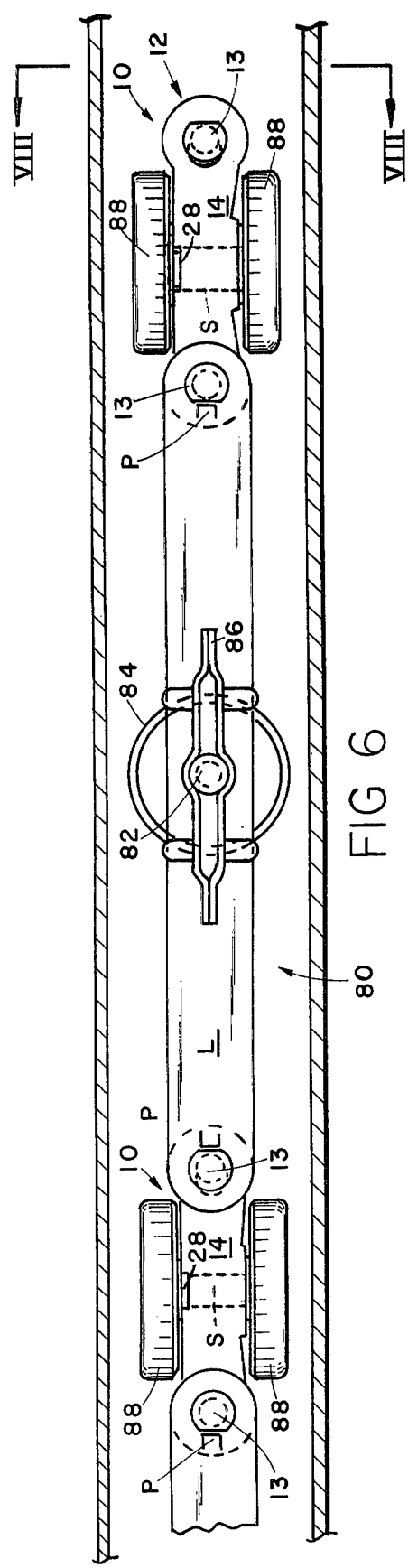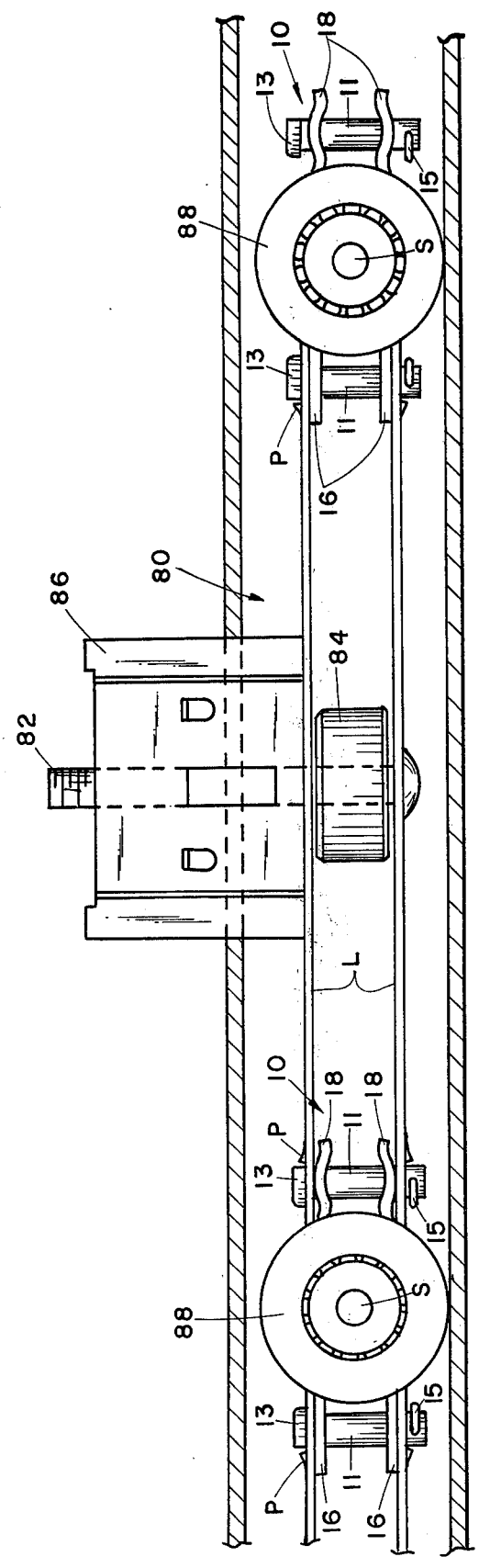

CHAIN LINK AND CHAIN ASSEMBLY INCLUDING SAME

BACKGROUND OF THE INVENTION

This invention relates to chain links and chain link assemblies for conveyor chains and, more particularly, to an improved chain link assembly especially adapted for use in enclosed track-type conveyor chains.

Conventional enclosed track-type conveyors, which may be built into the floor of a plant or facility or supported overhead, usually include numerous curves, both horizontal and vertical. Conveyor chain used in such enclosed track environments includes support wheels rotatable in two planes, both horizontal and vertical, to both provide the main support for the conveyor chain within the track as well as to space the chain and keep it from binding within the track as it moves around the various curves. Such chain includes various links or link assemblies and must pivot or articulate around the curves. Typically, the vertical curves have a larger radius than the horizontal curves in such conveyor systems with the minimum radius being three feet for horizontal curves and five feet for vertical curves. Such radii require articulation through approximately 20° for horizontal curves and 14° for vertical curves.

Certain prior chain used in enclosed track environments utilized long support links for supporting the objects moved by the conveyor. Shorter connecting links provided the articulation between the longer links. The shorter connecting links supported the main chain support wheels while the longer links included the spacing wheels to prevent binding.

One such prior chain included shorter connecting links formed from sintered, powdered metal and pivotally joined to one another. Although relatively strong in compression, the powdered metal links were found to be relatively weak in tension which is the most significant force applied to enclosed track-type conveyor chains. Accordingly, such chain links often broke under severe stress and uneven loading, were expensive to manufacture, and also had a tendency to wear heavily especially at the areas joined to the other links by chain pins or fasteners. Further, it was very difficult to plate such connecting links with noncorrosive metal to prevent corrosion as is required for use of such chain in food handling industries and other sanitary conditions.

Therefore, a need existed for an improved enclosed track-type conveyor chain and especially for a connecting link for use in such chain which would overcome the above problems and yet provide the necessary amount of articulation.

Related but distinct chain link assemblies and chains are disclosed in commonly assigned United States patent application Ser. No. 80,655, invented by Gerald W. Gurney and filed on even date herewith.

SUMMARY OF THE INVENTION

Accordingly, the present invention provides a chain link assembly for use in conveyors, and especially in enclosed track-type conveyors, which allows articulation in at least two dimensions, is strong in both tension and compression, is wear resistant, and can be easily and inexpensively manufactured. In addition, the parts of the chain link assembly of the present invention can be easily plated making the assembly highly adaptable for use in sanitary food handling environments.

In one form, the chain link assembly of the present invention includes first and second identical, elongated, rigid link members, each member having a longitudinal portion and a transverse bridge portion. The longitudinal portion has first and second opposed ends with an opening in each end for receiving fastening means for attaching the assembly in a chain. One of the opposed ends of each of the link members includes a curved surface facing outwardly of the assembly. The opening in the one end of each of the link members is elongated in the direction of elongation of the link member. The other of the opposed ends of each link member is generally planar. The bridge portion is intermediate the openings and opposed ends and adapted to engage, support and index each opposite longitudinal portion. When the link members are fitted together and receive fastening means, the link members form a chain link assembly with spaced, longitudinally extending sides supported through the bridge portions. The curved surface end of each of the link members is at the same end of the assembly to allow articulation of the assembly when that end is connected in a chain.

Preferably, the bridge members may also include means for receiving chain support wheel supports and indexing means for locating and aligning the link members with respect to one another and to maintain the openings in the link members in alignment.

In another form of the invention, the chain link assembly of the present invention is included in a conveyor chain. The chain includes the link assembly, at least one second chain link means for connection to the openings at one end of the first chain link assembly to form a chain and fastening means extending through the openings at the said one end of the first chain link assembly and a portion of the second chain link means for attaching the assembly together and allowing articulation between the various link parts. The conveyor chain also includes first wheel means rotatable in at least one plane on the first chain link assembly for supporting the chain when mounted in an enclosed-type conveyor track and second wheel means rotatable in a second plane perpendicular to the first plane for supporting the chain when mounted in an enclosed-type conveyor track.

The link assembly of the present invention provides increased rigidity as a connecting link of a chain of the type used in an enclosed track conveyor. When formed from stamped sheet metal, the link assembly may be hardened for excellent wear resistance while still including a soft metal core for high strength, especially in tension. The indexing means on the bridge members maintain axial alignment of the fastener holes. The curved surfaces located at only one end of the link assembly allow articulation in combination with other link structures in the chain but prevent the other link assemblies supported between the chain support wheels from dropping below the general plane in which the other link assemblies are supported. Further, the bridge members support an axle for attaching the chain support wheels which is secured in a fixed position and does not act as a pivot pin thereby increasing the length of the life of the wheel support shaft. Also, the chain, when stamped from sheet metal, can be formed very accurately so that the pitch of the chain is more precise while also allowing faster formation of the various portions such as the pin receiving holes. Further, such chain can be easily plated to prevent corrosion. As such, the chain link assembly is stronger, longer wearing, less expensive and better suited to various environments including sanitary food handling environments.

These and other objects, advantages, purposes and features of the invention will become more apparent from a study of the following description taken in conjunction with the drawings.

BRIEF DESCRIPTION OF THE DRAWINGS

FIG. 1 is a side elevation of one link member of the chain link assembly of the present invention;

FIG. 2 is a bottom plan view of the link member shown in FIG. 1;

FIG. 3 is an end view of the link member shown in FIGS. 1 and 2;

FIG. 4 is a perspective view of the link assembly utilizing two of the identical link members shown in FIGS. 1-3;

FIG. 5 is a side elevation of the link assembly of FIG. 4 assembled in an enclosed track-type chain;

FIG. 6 is a plan view of an enclosed track-type conveyor chain assembled within an enclosed track and incorporating the chain link assembly shown in FIG. 4;

FIG. 7 is a side elevation of the enclosed track-type conveyor chain shown in FIG. 6; and FIG. 8 is an end view of the chain shown in FIGS. 5 and 6 taken along plane VIII—VIII of FIG. 6.

DESCRIPTION OF THE PREFERRED EMBODIMENTS

Referring now to the drawings in greater detail, FIGS. 1-4 illustrate one embodiment 10 of the chain link assembly of the present invention. Link assembly 10 is especially useful in enclosed track-type conveyor environments such as that shown in FIGS. 5-8. Although not used to indicate a track which is closed completely around a chain, the term enclosed track is used as it is in the conveyor industry to indicate a conveyor track which has wall surfaces or support surfaces on at least three sides of a chain. A typical enclosed track T having side and bottom walls and an elongated slot or opening in the top wall is best seen in FIG. 8.

Link assembly 10 includes a pair of identical link members 12 which engage, mate and register with one another to form the assembly. Each link member 12 includes a generally planar body portion 14 extending between opposing ends 16, 18. Ends 16, 18 include chain pin fastener receiving openings 20, 22 respectively. Opening 20 is circular and centered in end 16. End 16 is generally planar and flush with the body portion 14 and extends therefrom. End 18 includes a generally cylindrical, convex, outwardly facing curved surface extending transverse to the direction of elongation of the link member. The outermost surface of the curved surface is flush with body portion 14 as shown in FIG. 1. Opening 22 is formed in the curved surface of end 18 and is elongated in the direction of elongation of the link member 12. When assembled with another link member 12 as described below, contoured ends 18 are adapted to be aligned with one another with the curved surfaces facing outwardly to allow articulation of the chain link assembly at that one end with respect to other links attached to that one end. The generally cylindrical surfaces of the contoured ends are positioned with the axes of the cylinders extending transverse to the direction of elongation of the link. The combination of the elongated openings 22 and the curved cylindrical surfaces on ends 18 allows the chain to move in the plane of the axis of the chain pins adapted to be received through openings 22.

One edge of the body portion 14 tapers inwardly to a central location at which a rigid flange or bridge member 24 is bent outwardly perpendicularly to the plane of the body portion 14. Bridge member 24 is generally rectangular and includes a circular opening 26 adapted to receive a chain wheel support shaft press fitted therethrough when assembled with another like link member 12. The bridge member 24 also includes an outwardly projecting indexing tab 28 projecting from the planar bottom edge 30 of the bridge member. Tab 28 is adapted to be received within a correspondingly shaped recess 32 formed in the opposite edge of body portion 14 of another of the chain links 12. The height of tab 28 corresponds to the thickness of body portion 14. Tabs 28 index and locate the link members 12 longitudinally of one another and maintain openings 20, 22 and 26 in registry and alignment with one another while bridge members 24 space the body portions of the link members apart.

FIG. 4 illustrates the assembly of the link members 12. Link members 12 are rigidly supported and spaced with respect to one another by the bottom surfaces 30 of bridge members 24. Bridge members 24 and the body portions 14 of the opposing link members provide a box-like midsection for the link assembly which strengthens and rigidifies the assembly. The length of the bottom edges 30 is sufficient to prevent the link members from tipping with respect to one another. The bridge members also maintain chain pin receiving openings 20, 22 in alignment and registry with one another and are parallel to the direction of elongation of the link member. Openings 26 are sized to receive a shaft having reduced diameter ends and a larger diameter center portion which spaces bridge members 24 apart. The ends of the shaft support the inner race of a chain wheel bearing structure of the type shown in FIGS. 5-8. When the wheels are press fitted on the shaft ends the assembly becomes permanent. This form of the invention also allows assembly of the shaft with one link member 12 and one wheel 88 at a time followed by assembly of another link member and wheel.

When assembled in a chain as shown in FIG. 5, chain pins or fasteners 11, which are cylindrical and rectilinear, are placed and extend through aligned openings in the ends of other link members L and through the aligned openings 20 and 22. Heads 13 and cotter keys or other removable fasteners 15 on the chain pin ends retain link members L against the curved outside surfaces of the opposing, aligned ends 18 of the link members 12 with a slight amount of clearance. Similarly, link members L are held against the planar ends 16 at the opposite end of the assembly 10. Even though the openings in link members L are not oversized, and even though the heads 13 include flats abutting projections P on the link members to prevent skewing of the pins in the link members L, articulation of the chain in the plane of the pin axes at the end of the assembly including link member ends 18 is still allowed. This is because that end of the assembly 10 may pivot by means of the elongated openings 22 and the curved surfaces on ends 18. Simultaneously, bridge members 24 maintain the spacing of link members 12 and prevent collapse of the members maintaining them in contact with the inside surfaces of link members L.

Referring to FIGS. 6–8, an enclosed track-type conveyor chain 80 utilizing link assembly 10 as connecting links is shown. Enclosed track-type conveyor chain 80 includes a plurality of pairs of elongated work piece support links L which are preferably stamped from sheet metal and include a circular opening in their opposed ends. These openings are aligned with like openings in a like link member L as shown in FIGS. 6 and 7. Link members L also include central circular openings which receive a vertically upwardly extending carriage bolt 82. Bolt 82 forms a shaft supporting a horizontally rotatable bearing wheel unit 84 between link members L. Wheel 84 is adapted to engage the side surfaces of the enclosed conveyor track to keep the chain from binding against the sides of the track and spaced therefrom. Secured atop the carriage bolt 82 is a work support assembly 86 adapted to project through the slot or opening between the opposed enclosed track edges in the top wall of the track as shown in FIGS. 7 and 8.

Link assemblies 10 are pivotally attached to the opposite ends of longer link assemblies formed from aligned link members L by means of chain pins 11 (FIG. 7). The assembly of link assemblies 10, including link members 12, with link members L is the same as that described in connection with FIGS. 5. The upwardly bent projections P adjacent the pin receiving openings in link members L (FIGS. 6 and 7) are adapted to have edge surfaces engaging flats on the heads 13 of the chain pins to prevent the pins from rotating and also to resist skewing of the pins or allowing the link members L to shift with respect to one another.

Extending through the aligned openings 26 in bridge members 24 of link members 12 are chain wheel support shafts S (FIG. 7). The reduced diameter ends of shafts S are fitted through openings 26 to remain stationary and fixed against rotation to provide longer life. The ends of the shafts are pressed into the inner races of wheel bearing units 88 which provide the principal support for the chain assembly 80. Such assembly of the wheels can occur one at a time as mentioned above. Chain support wheels 88 associated with each of the link assemblies 10 are adapted to rotate in vertical planes and perpendicular to the plane of rotation of wheel 84.

As will now be understood, the curved surfaces and elongated openings at one end of chain link assemblies 10 allow vertical articulation of the link assemblies 10 with respect to link members L at vertical curves in the track T. Such articulation is generally in the place of the axes of chain pins 11. However, the pairs of aligned link members L intermediate link assemblies 10 and not supported directly by wheels 88 are prevented from dropping below the planes of link members 12 and are retained in the relationship shown in FIG. 7 because of planar ends 16. Only when the entire section of chain connected to ends 18 moves around a curve can articulation in the plane of the axis of pins 11 occur at ends 18. Thus, support of work pieces being carried by the chain continues in the same plane along rectilinear portions of the conveyor. Horizontal articulation or pivoting around pins 11 transverse to the extension of their axes is provided by both openings 20 and 22 in link members 12. The above articulation is sufficient to accommodate the typical vertical and horizontal curves in an enclosed track conveyor system while the wheels 84, 88 support the chain within the track T and prevent it from binding when negotiating such curves.

Link assemblies 10, when stamped from sheet metal having a thickness of approximately 0.125 inches and formed from sheet C-1010 steel, have been found to have excellent tension resistance in such enclosed track environments. In addition, the stamped links are preferably case hardened after stamping. This provides a softer inner core for high strength in tension and hardened outer core providing wear resistance especially at the openings in the link member ends which engage the bodies of the chain pins 11 during articulation around horizontal and vertical curves. Typically, chain pins 11 will have a diameter of 0.375 inches while openings in the chain link members will have a width or diameter of 0.378 inches and an elongated length of 0.505 inches. The radius of curvature of the cylindrical surfaces at the ends 18 of the link members 12 is typically 0.625 inches. Link members 12 are typically approximately 3.80 inches long.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A chain link assembly comprising first and second identical, elongated, rigid link members, each link member having a longitudinal portion and a transverse bridge portion, said longitudinal portion having first and second opposed ends with an opening in each end for receiving fastener means for attaching said assembly in a chain, one of said opposed ends of each of said link members including a curved surface facing outwardly of said assembly, the other of said opposed ends of each link member being generally planar; said opening in said one end in each of said link members being elongated in the direction of elongation of said link member, said bridge portion being intermediate said openings and opposed ends and adapted to engage, support and index each opposite longitudinal portion such that when said link members are fitted together and receive fastener means, said link members form a chain link assembly with spaced, longitudinally extending sides supported through said bridge portions; said bridge portions each including support means for supporting a conveyor support wheel support; said one end of each of said link members being at the same end of said assembly to allow articulation of said assembly at said end when connected in a chain.

2. The chain link assembly of claim 1 wherein a portion of each of said link members intermediate said opposed ends is generally planar; said bridge portions each being generally planar and extending perpendicularly between said planar portions of said link members.

3. The chain link assembly of claim 2 wherein said bridge members are parallel to the direction of elongation of said link members and extend between aligned, opposing edges of said link members.

4. The chain link assembly of claim 1 or 3 wherein said link members are aligned with said openings in said ends being axially aligned at either end of said assembly, the axes of alignment of said openings at either end being parallel to one another, said support means on said bridge portions including at least one opening extending therethrough generally transverse to the axes of alignment of said link member openings for receiving a shaft therethrough.

5. The chain link assembly of claim 1 wherein said curved surfaces at said end of said assembly are each cylindrical surfaces, the axes of said cylindrical surfaces extending generally transverse to the direction of elongation of said link members.

6. The chain link assembly of claim 1 wherein said openings in the other ends of said link members are circular.

7. A chain link assembly comprising first and second identical, elongated, rigid link members, each link member having a longitudinal portion and a transverse bridge portion, said longitudinal portion having first and second opposed ends with an opening in each end for receiving fastener means for attaching said assembly in a chain, one of said opposed ends of each of said link members including a curved surface facing outwardly of said assembly, the other of said opposed ends of each link member being generally planar; said opening in said one end in each of said link members being elongated in the direction of elongation of said link member, said bridge portion being intermediate said openings and opposed ends and adapted to engage, support and index each opposite longitudinal portion such that when said link members are fitted together and receive fastener means, said link members form a chain link assembly with spaced, longitudinally, extending sides supported through said bridge portions; said one end of each of said link members being at the same end of said assembly to allow articulation of said assembly at said end when connected in a chain; said bridge portions including indexing means for locating and aligning said link members with one another and with respect to said bridge portions; said longitudinal portions include recess means for receiving said indexing means.

8. The chain link assembly of claim 7 wherein said indexing means on each bridge portion includes an indexing tab projecting therefrom; said recess means on each link member including a recess for receiving one of said indexing tabs for locating and aligning said link members with one another and with respect to said bridge portions.

9. A conveyor chain for enclosed-type conveyor track comprising:

A first chain link assembly including first and second identical, elongated, rigid link members, each link member having a longitudinal portion and a transverse bridge portion, said longitudinal portion having first and second opposed ends with an opening in each end for receiving fastening means for attaching said assembly in a chain, one of said opposed ends of each of said link members including a curved surface facing outwardly of said assembly, the other of said opposed ends of each link member being generally planar, said planar link ends resisting articulation of said first link assembly with respect to another link means joined thereto except about a fastener when inserted between said first link assembly and another link means; said opening in said one end in each of said link members being elongated in the direction of elongation of said link member, said bridge portion being intermediate said openings and opposed ends and adapted to engage, support and index each opposite longitudinal to said one direction when mounted in an enclosed-type conveyor track.

10. The conveyor chain of claim 9 wherein said bridge portions are aligned.

11. The conveyor chain of claim 10 wherein said means for supporting said first wheel means include at least one opening in each bridge portion extending generally transverse to said openings in said first and second link members and a shaft for supporting said first wheel means being received in said openings in said bridge means.

12. The conveyor chain of claim 9 wherein said bridge portions include indexing means for locating and aligning said link members with one another and with respect to said bridge portions.

13. The conveyor chain of claim 9 wherein said openings in said other ends of said link members are circular.

14. The conveyor chain of claim 9 wherein said second chain link means includes third and fourth elongated, aligned link members, each of said third and fourth link members including opposed ends having an opening for receiving said fastening means, said openings in said opposed ends of said third and fourth link members being axially aligned with one another and with the openings at said one end of said first chain link assembly, said third and fourth link members being outside said curved surfaces on said one end of said first chain link assembly; said fastening means extending through said aligned openings in said first chain link assembly and said second chain link means for attaching one link assembly to the other and allowing articulation between said assemblies.

15. The conveyor chain of claim 14 wherein said fastening means includes a generally cylindrical chain pin including means at either end of said pin for retaining said first, second, third and fourth link members therebetween.

* * * * *

UNITED STATES PATENT AND TRADEMARK OFFICE
CERTIFICATE OF CORRECTION

PATENT NO. : 4,297,840

DATED : November 3, 1981

INVENTOR(S) : Gerald W. Gurney, William E. Lanham, Jr.

It is certified that error appears in the above—identified patent and that said Letters Patent is hereby corrected as shown below:

Column 8, line 13, claim 9:

After "longitudinal" add page five from amendment as follows:

--portion such that when said link members are fitted together and receive said fastening means, said link members form a chain link assembly with spaced, longitudinally extending sides supported through said bridge portions; said bridge portions each including support means for supporting chain support wheel means; said one end of each of said link members being at the same end of said assembly to allow articulation of said assembly at said end when connected in a chain;

at least one second chain link means for connection to said openings at said one end of said first chain link assembly to form a chain;

fastening means extending through said openings at said one end of said first chain link assembly and a portion of said second chain link means for attaching said assembly to said second chain link means and allowing articulation between said end of said assembly and second chain link means;

UNITED STATES PATENT AND TRADEMARK OFFICE
CERTIFICATE OF CORRECTION

PATENT NO. : 4,297,840

DATED : November 3, 1981

INVENTOR(S) : Gerald W. Gurney, William E. Lanham, Jr.

It is certified that error appears in the above—identified patent and that said Letters Patent is hereby corrected as shown below:

first wheel means supported by said support means on said bridge means of said first chain link assembly and rotatable in one plane for supporting said chain in one direction when mounted in an enclosed-type conveyor track; and second wheel means on said second chain link means rotatable in a second plane which is perpendicular to said one plane for supporting said chain in a direction perpendicular--

Signed and Sealed this

Eighteenth Day of May 1982

[SEAL]

*Attest:*

*Attesting Officer*

GERALD J. MOSSINGHOFF

*Commissioner of Patents and Trademarks*